(12) United States Patent
Mueller

(10) Patent No.: US 7,097,169 B2
(45) Date of Patent: Aug. 29, 2006

(54) ELASTOMERIC BEARING WITH MODIFIED CYLINDRICAL CORE

(75) Inventor: Thomas G. Mueller, Elk Grove Village, IL (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 10/911,015

(22) Filed: Aug. 4, 2004

(65) Prior Publication Data
US 2006/0027957 A1    Feb. 9, 2006

(51) Int. Cl.
    *F16F 7/00* (2006.01)
(52) U.S. Cl. .................. 267/141.1; 267/140.4; 267/294; 384/221; 280/124.155; 416/134 A
(58) Field of Classification Search ............ 267/273, 267/140.4, 141.1, 141.2, 141.3, 141.7, 282, 267/294; 384/221, 222; 416/134 A, 134 R
    See application file for complete search history.

(56) References Cited

U.S. PATENT DOCUMENTS

| | | | |
|---|---|---|---|
| 3,556,673 A * | 1/1971 | Killian .................. 416/134 R |
| 3,807,896 A * | 4/1974 | Johnson ..................... 416/102 |
| 3,857,556 A * | 12/1974 | Wing ........................ 267/294 |
| 4,032,125 A * | 6/1977 | Minakawa et al. ......... 267/294 |
| 4,040,690 A * | 8/1977 | Finney ....................... 384/221 |
| 4,142,833 A * | 3/1979 | Rybicki et al. ......... 416/134 A |
| 4,232,563 A * | 11/1980 | Peterson et al. .............. 74/470 |
| 4,286,827 A | 9/1981 | Peterson et al. |
| 4,291,925 A | 9/1981 | Peterson et al. |
| 4,293,277 A * | 10/1981 | Aubry ..................... 416/134 A |
| 4,357,057 A | 11/1982 | Peterson et al. |
| 4,395,143 A | 7/1983 | Bakken et al. |
| 4,522,563 A | 6/1985 | Reyes et al. |
| 4,846,509 A | 7/1989 | Moore |
| 4,859,148 A | 8/1989 | Hibyan |
| 4,890,949 A | 1/1990 | Wood, Jr. |
| 4,892,417 A | 1/1990 | Spargo et al. |
| 4,892,444 A | 1/1990 | Moore |
| 4,895,354 A | 1/1990 | Byrnes |
| 4,910,930 A | 3/1990 | Way |
| 4,913,411 A * | 4/1990 | Collins et al. ........... 267/141.5 |
| 4,971,296 A * | 11/1990 | Kondo ....................... 267/220 |
| 4,982,938 A | 1/1991 | Brenner |
| 4,986,735 A | 1/1991 | Robinson |
| 5,035,576 A | 7/1991 | Byrnes et al. |
| 5,061,110 A | 10/1991 | Wood, Jr. |
| 5,074,494 A | 12/1991 | Doolin et al. |
| 5,083,725 A | 1/1992 | Byrnes et al. |
| 5,092,738 A | 3/1992 | Byrnes et al. |
| 5,101,905 A | 4/1992 | Arlt et al. |
| 5,110,259 A | 5/1992 | Robinson |
| 5,110,260 A | 5/1992 | Byrnes et al. |
| 5,112,144 A | 5/1992 | Law |

(Continued)

Primary Examiner—James McClellan
Assistant Examiner—Mariano Sy
(74) Attorney, Agent, or Firm—Vedder Price Kaufman & Kammholz

(57) ABSTRACT

An elastomeric bearing having inner and outer races and a core. The core has a plurality of resilient laminae and a plurality of non-resilient laminae interleaved with one another. Each of the lamina has an axially inner cylindrical portion of a given diameter, an axially outer cylindrical portion of a greater diameter than the given diameter and, lying between the inner and outer laminae, an angled portion joining the axially inner and outer laminae to each other. The laminae are continuous and of one piece. In this way, the elastomeric bearing has comparatively small resistance to torsional movement, but great resistance to both radial and axial movement.

16 Claims, 5 Drawing Sheets

U.S. PATENT DOCUMENTS

| | | | |
|---|---|---|---|
| 5,113,713 A | 5/1992 | Isabelle et al. | |
| 5,135,357 A | 8/1992 | Pancotti | |
| 5,145,321 A | 9/1992 | Flux et al. | |
| 5,156,527 A | 10/1992 | Pancotti | |
| 5,163,769 A | 11/1992 | Dresselhouse | |
| 5,163,772 A | 11/1992 | Wood | |
| 5,165,853 A | 11/1992 | Pancotti | |
| 5,215,502 A | 6/1993 | Neathery et al. | |
| 5,224,783 A | 7/1993 | Schmidt et al. | |
| 5,228,663 A | 7/1993 | Adler et al. | |
| 5,261,748 A | 11/1993 | Kameda | |
| 5,297,874 A | 3/1994 | Raines | |
| 5,324,141 A | 6/1994 | Hunter et al. | |
| 5,330,322 A | 7/1994 | Aubry | |
| 5,340,094 A | 8/1994 | Schyboll et al. | |
| 5,386,783 A | 2/1995 | Rhen et al. | |
| 5,386,973 A | 2/1995 | Brenner et al. | |
| 5,454,330 A | 10/1995 | Rhen | |
| 5,482,121 A | 1/1996 | Draney et al. | |
| 5,601,408 A | 2/1997 | Hunter et al. | |
| 5,644,000 A | 7/1997 | Guillot | |
| 5,709,605 A | 1/1998 | Riefe et al. | |
| 5,915,842 A | 6/1999 | Redinger | |
| 5,932,049 A | 8/1999 | Orndorff, Jr. et al. | |
| 5,997,109 A | 12/1999 | Kautsch | |
| 6,203,083 B1 | 3/2001 | Reimann | |
| 6,224,047 B1 | 5/2001 | Gwinn | |
| 6,231,264 B1 | 5/2001 | McLaughlin et al. | |
| 6,238,093 B1 | 5/2001 | Orndorff, Jr. et al. | |
| 6,247,688 B1 * | 6/2001 | De Fontenay et al. | 267/220 |
| 6,386,529 B1 | 5/2002 | Bik et al. | |
| 6,406,184 B1 | 6/2002 | Orndorff, Jr. et al. | |
| 6,412,982 B1 | 7/2002 | Park | |
| 6,413,048 B1 | 7/2002 | Muylaert | |
| 6,481,894 B1 | 11/2002 | James | |
| 6,527,261 B1 | 3/2003 | Breitfeld et al. | |
| 6,637,736 B1 | 10/2003 | Eller et al. | |
| 6,644,635 B1 | 11/2003 | Breitfeld et al. | |
| 6,666,648 B1 | 12/2003 | Bernhard et al. | |
| 6,712,313 B1 | 3/2004 | Zoppitelli et al. | |
| 6,889,965 B1 * | 5/2005 | Loftus et al. | 267/136 |
| 2003/0211894 A1 | 11/2003 | Rivin | |
| 2003/0222171 A1 | 12/2003 | Zoppitelli et al. | |

* cited by examiner

ELASTOMERIC BEARING WITH MODIFIED CYLINDRICAL CORE

The present invention relates generally to elastomeric bearings and, more particularly, to a novel form of elastomeric bearings wherein the laminae have the form of a "lazy z" that provides both radial and axial stiffness and yet allows ready rotational movement.

In one embodiment, the elastomeric bearings, when used to mount helicopter blades, provide ready movement along the flap axis of such blades, while also providing great resistance to movement in other dimensions, namely, the radial dimension and the axial dimension. In another embodiment, the bearings are used as suspension supports in a heavy tracked vehicle, affording a relatively smooth ride but great transverse and cocking stiffness, necessary to resist misalignment when turning.

Thus, in an illustrative embodiment, the helicopter blade is preferably secured to the hub by means of a tee member which undergoes two distinctly different motions independent of each other; a flap motion or motion along one axis, called the flap axis; and a pitch motion or motion along another axis, called the pitch axis. In this case, the flap axis is defined by a shaft fastened to the inner races of a pair of elastomeric bearings, one on each side of a tee.

This tee axis is the same as the flap axis, that is, any flap motion of the blade tends to rotate the blade about the flap axis, with the blade going up or down. This rotation or turning is allowed by the elastomeric bearings, which resist the motion somewhat, but the axial motion and cocking motion are resisted many hundred or even thousands of times greater.

Regarding this construction, each elastomeric bearing has an inner race, an outer race and a plurality of laminae interleaved between the inner and outer races. The shape of the laminae is of great importance to the invention, and this shape provides several unique advantages. With this novel construction, the stresses at the ends of the bearings are the greatest when the load is radial, but when the load is axial, the stresses are the greatest at the edges of the "Z". Thus, because of the distribution of stresses, this design of elastomeric bearing will have many times the life of bearings of a more conventional design.

By way of illustration, the inner race is secured to a transverse shaft forming the head of the tee, which is moveable about its axis as the flapping action takes place. Each outer race of the two elastomeric bearings is secured in relation to one yoke leg having cylindrical retainers for the bearings. The elastomeric bearings have a great deal of stiffness radially, which is the dimension in which centrifugal force in use pushes the blades. However, the elastomeric bearings have comparatively little resistance to rotation.

With the flap shaft being connected to the two inner races, the laminae of the bearing may rotate about the tee forming this axis. Because of the novel configuration of the shells or laminae, and the arrangement of the laminae in the core of the elastomeric bearing, it has a great resistance also to axial or endwise movement.

In the past, this resistance to axial movement has been provided by other elastomeric bearings, for example, those made with small sections of a sphere, or with separate, flat elastomeric bearings providing resistance to axial movement along the flap shaft. Each of these bearings had only one point at which the load was concentrated.

It has not heretofore been thought that a single bearing could provide the necessary resistance to movement in two dimensions and also allow a desired amount of movement in the other dimension. These functions, according to the invention, are now placed in a single bearing having a stepped or lazy "Z" structure. In one example, of the preferred construction, there are two bearings opposing each other, but each one is a mirror image of the other, and they provide the necessary radial and axial resistance while allowing a twisting flap motion by the flap shaft that serves as a pivot point of the blade. Since the pitch axis allows movement in a way which is not affected by the elastomeric bearings of the invention, it need not be further discussed herein except in a general sense.

The additional movement of the typical helicopter blade involves a lead-lag motion, which is also not discussed herein, since it has its own axis of movement, which is controlled by things other than those described in detail herein.

In view of the failure of the prior art to provide an elastomeric bearing providing radial and axial stiffness, while allowing twisting or rotational movement among the layers that are alternately resilient and non-resilient layers, it is an object of the present invention to provide such a elastomeric bearing.

It is another object of the invention to provide an elastomeric bearing having inner and outer races, with similar complex contours in the various laminae.

A still further object is to provide a particular type of laminae which will provide the necessary stiffness on two axes and yet allow relatively more free motion in another axes.

A further object is to provide one or more elastomeric bearings having an outer race and an inner race, each of the races accommodating a number of shells or laminae and each having a step or offset in between the various laminae.

A further object is to provide a pair of elastomeric bearings arranged in a mirror image relation in order to provide symmetrical resistance to movement along various axes, and for achieving a compact arrangement of load support members.

Another object is to provide a series of continuous laminae, alternately made from a stiff material and an elastomer, with each of the laminae including two cylindrical portions of different diameters, joined by an angular transition portion extending between the two cylindrical portions.

A still further object is to provide bearings in which the laminae have a different degree or portion of offset, with the various different laminae being in intimate contact with each other.

A further object of the invention is to provide an elastomeric bearing wherein, in a cocking mode, the stresses are concentrated at one part of the bearing, and in an axial mode, the stresses are concentrated at an entirely different part of the bearing.

Another object of the invention is to provide an elastomeric bearing using stainless steel in every other laminae.

A further object is to create an elastomeric bearing using natural rubber, or a blend of natural rubber, in alternate laminae.

A still further object is to make an elastomeric bearing with laminae having a distinctive shape, namely, a larger and a smaller diameter with an intermediate angular portion, sometimes called a lazy "Z" shape.

Another object is to provide in a helicopter construction, an attachment for the outer race to its supporting frame or portion of the cylindrical bearing retainers.

A further object is to provide a keyed arrangement for attaching the inner race of the bearing to the flap shaft itself.

The invention achieves its objects, and other inherent objects and advantages, by providing an elastomeric bearing with inner and outer races, and a plurality of interleaved laminae, alternatively of rigid and non-rigid construction, with each of the laminae having first and second cylindrical portions of different diameters, each being joined by an angular correcting section.

The manner in which these and other objects and advantages of the present invention are achieved in practice will become more clearly apparent when reference is made to the accompanying detailed description of the preferred embodiments of the invention set forth by way of example, and shown in the accompanying drawings, in which like reference numerals indicate corresponding parts throughout.

DESCRIPTION OF THE PREFERRED
EMBODIMENTS OF THE INVENTION

Although the elastomeric bearing of the invention may assume different forms, an example of different ways of practicing the invention will now be described, namely, as a helicopter blade mounting system, and as a part of the suspension system for a crawler tractor.

Figure 1:
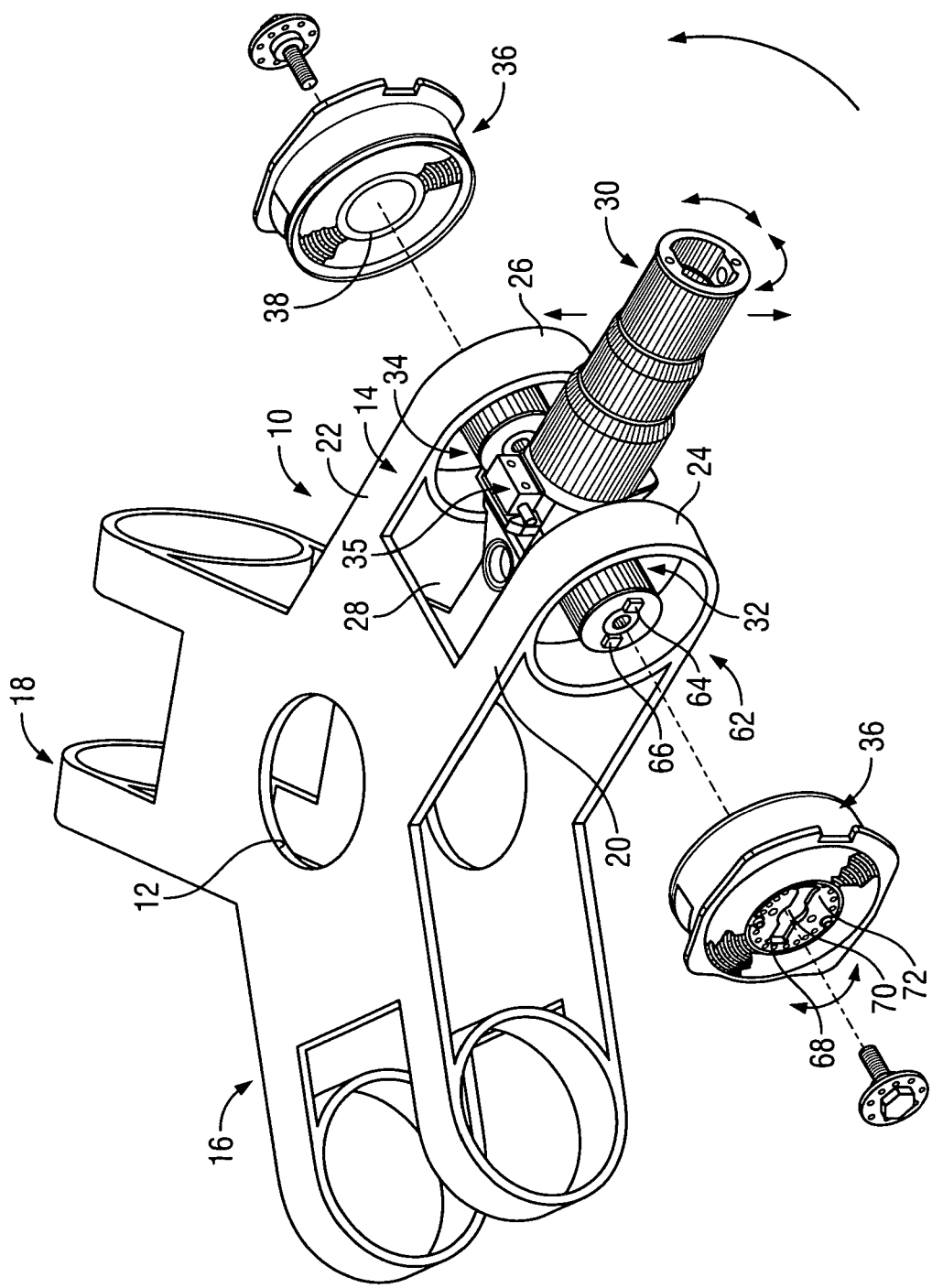
FIG. 1 is a somewhat simplified perspective view of one embodiment of the invention, showing a rotor yoke of a helicopter and several principal components thereof, including a pair of cylindrical bearing retainers forming the end portions of the rotor yoke leg, a flap axis shaft, and a pitch axis shaft, joined thereto and forming a tee, and a pair of elastomeric bearings allowing movement of the blade along the flap axis and restricting movement along two other axes.

Referring now to the drawings in greater detail, FIG. 1 shows somewhat schematically a helicopter rotor hub and generally designated 10 and including a central opening 12 for allowing a power shaft to drive the blades of the helicopter in a rotary motion. The helicopter blade mounting system will be understood to have three legs generally designated 14, 16 and 18, although a larger or smaller number may be present. Each leg comprises a pair of radially extending portions 20, 22 and each portion 20, 22 includes a cylindrical bearing retainer 24, 26.

The bearing retainers 24, 26 are separated from each other by an opening 28 in the leg 14 permitting vertical movement of the blade supports. Disposed within the opening 28 is a pitch shaft generally designated 30, and a pair of flap axis shafts generally designated 32, 34. These three shafts 30, 32, 34 collectively form a mounting tee generally designated 35. A pair of elastomeric bearings generally designated 36, 36 are adapted to be received in the bearing retainers 24, 26, and thus locate the cross bar of the tee 35. Inasmuch as the elastomeric bearings generally designated 36, 36 are identical, a detailed description will be given of only one such bearing 36.

Figure 2:
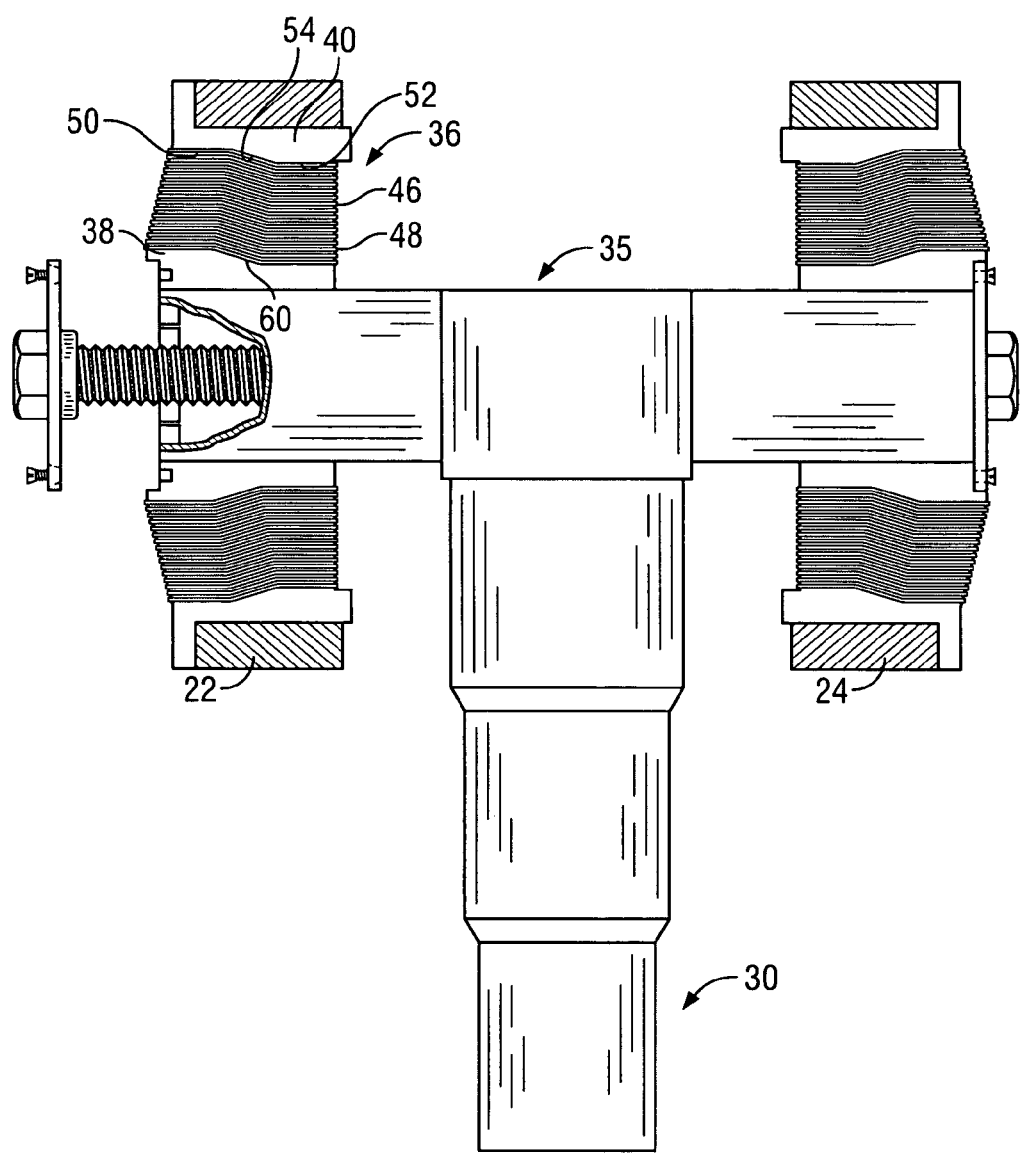
FIG. 2 is an enlarged, somewhat schematic plan view of the mounting tee of the invention, showing the pair of elastomeric bearings cooperating with the flap shaft and showing the bearing arrangement with the mounting tee.
Figure 4:
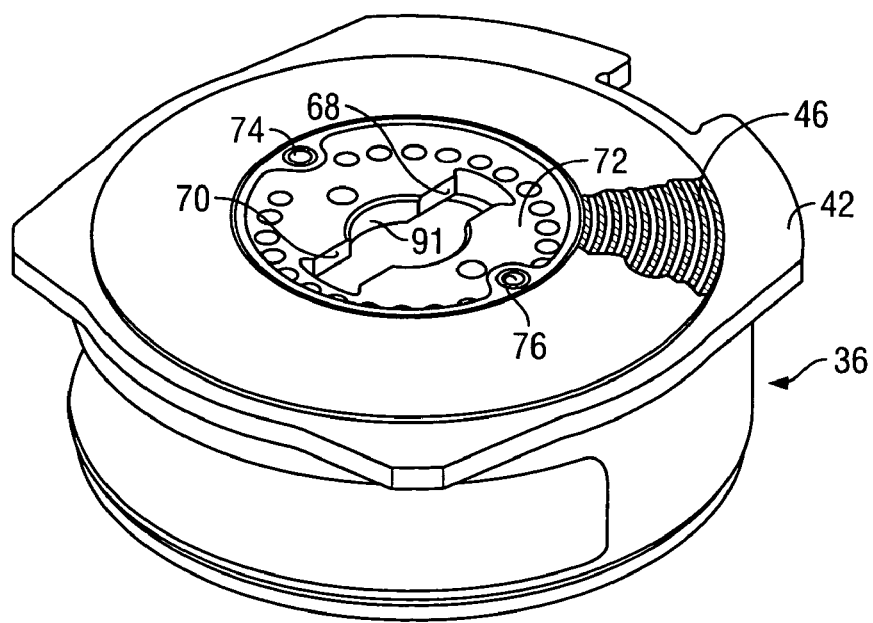
FIG. 4 is an enlarged perspective view of one of the elastomeric bearings of the invention, showing the same isolated from its environment.
Figure 5:
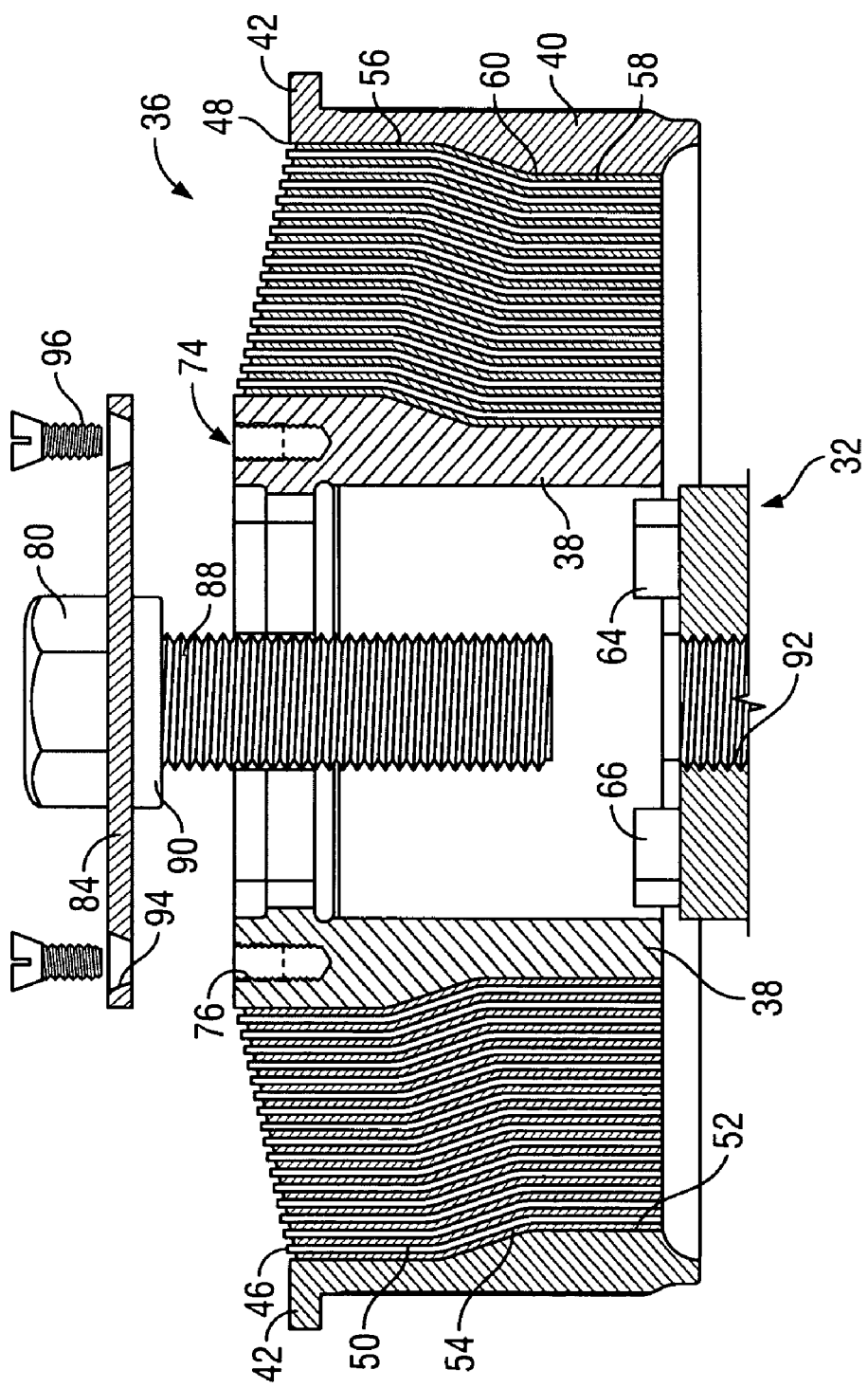
FIG. 5 is further enlarged vertical sectional view of the elastomeric bearing of the invention, showing the inner race, the outer race, means for attaching the inner race to its mounting tee, and showing a plurality of laminae between the inner and outer races, with each of the laminae being alternately an elastomeric lamina and a rigid lamina.

Referring now to this bearing generally designated 36, which is also shown in FIG. 2, but is best shown in FIGS. 4 and 5, the bearing includes an inner race 38, an outer race 40, and a flange 42 held in place relative to the outer race 40 by a press fit. The main body of the bearing 36 comprises a plurality of laminae 46, 48 alternatively preferably made from a stainless steel material and a natural rubber or a natural and synthetic blend. The metal laminae 46 and the rubber laminae 48 are interleaved and in a typical bearing there are 16 layers of metal and 17 layers of rubber, for example.

The outer metal layer comprises a cylindrical portion 50 of a given diameter at its outboard end, a smaller, cylindrical diameter portion at its inboard end 52, and a transition or offsetting angular surface 54 between the ends 50, 52. This shape can be called a "Z" shape, inasmuch as it is in the approximate form of a lazy or misshapen letter Z. Thus, the shapes of all the laminae are congruent, with the larger cylindrical portions of each laminae lying toward the outboard end of the bearing 36.

Referring now in greater detail to the mounting system for each bearing 36, and particularly to FIGS. 1, 2 and 4 the flap axis shaft 32 has a locating key generally designated 62 with two portions 64, 66 that snugly engage contoured openings 68, 70 in the apertured end plate 72. The end plate 72 also includes a pair of openings 74 having threaded passages 76 (FIG. 5) therein. Each bearing 36, 36 is secured to the flap axis shaft by a bolt 80, having an apertured captive washer 84, welded to the head of the bolt 80. The shank 88 of one bolt 80, for example, extends into the tapped opening 92 in the flap axis shaft 32. The keys 64, 66 extend into the openings 68, 70 in the flange plate 72. The bolt 80 also has a captive cylindrical shoulder 90 which fits just inside the keys 64, 66 and into the center opening 91 in the plate 72. Thus the bearing 36 is held very tightly in engagement with the tee 35. In addition, the openings 76 in the plate 72 are registered with the openings 94 in the captive washer 84, and security fasteners 96 additionally fasten these parts together.

Figure 3:
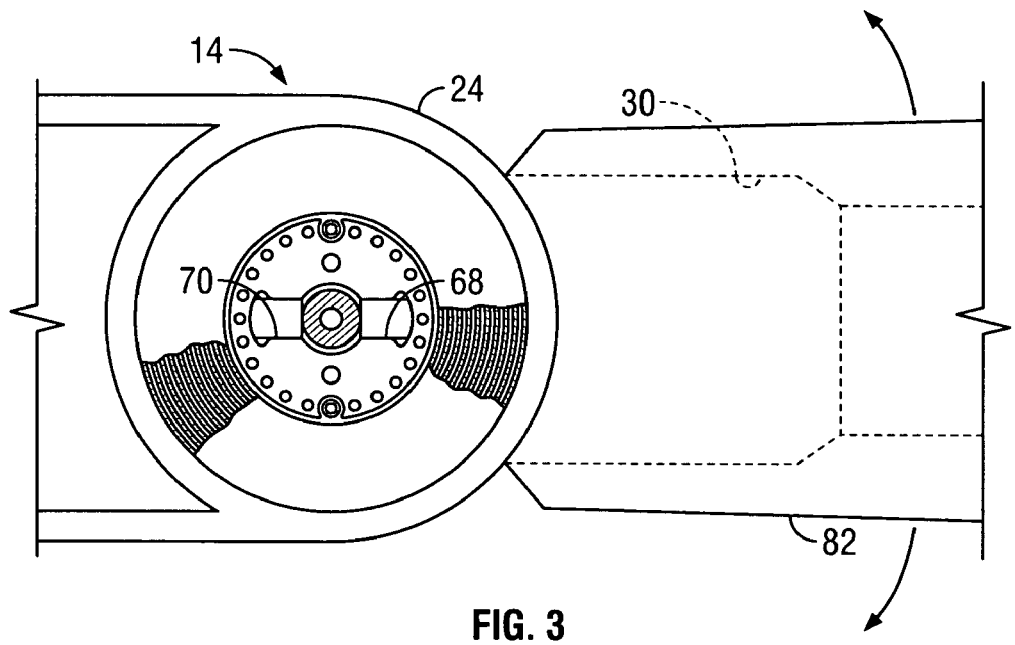
FIG. 3 is a partly schematic drawing showing the direction of movement of the blades about the flap axis, and showing the shaft keyed to the inner race of the bearing.

Referring now in particular to FIG. 3, a blade 82 is shown somewhat schematically to be affixed to the pitch shaft 30. It will be understood that the blade 82 undergoes pitch changes as shown in FIG. 1, but it should also be understood that, regardless of such pitch changes, if any, the blade 82 will undergo a given amount of flap, both up and down. The degree of flap depends on the maneuvers of the helicopter, and so, in part, by movement of the pitch shaft. At any rate, the flap shaft moves up and down, as shown in FIG. 3, while the outer race 40 and the retainer 24 remain fixed and the inner race 38 and the keys 62 including the portions 64, 66 engaged with the openings 68, 70 undergoes more or less deflection, perhaps up to as much as 30°. During this flapping motion, there is virtually no endwise motion of the elastomeric bearing 36, nor virtually any radial motion.

According to the invention, the single Z-bearing or bearing with the connecting section 60 achieves the advantages of not having a separate bearing to take the endwise thrust, without taking up the space such a construction would require, and also localizing the stresses in two separate areas, namely, the end portion and the "Z" portions.

Figure 6:
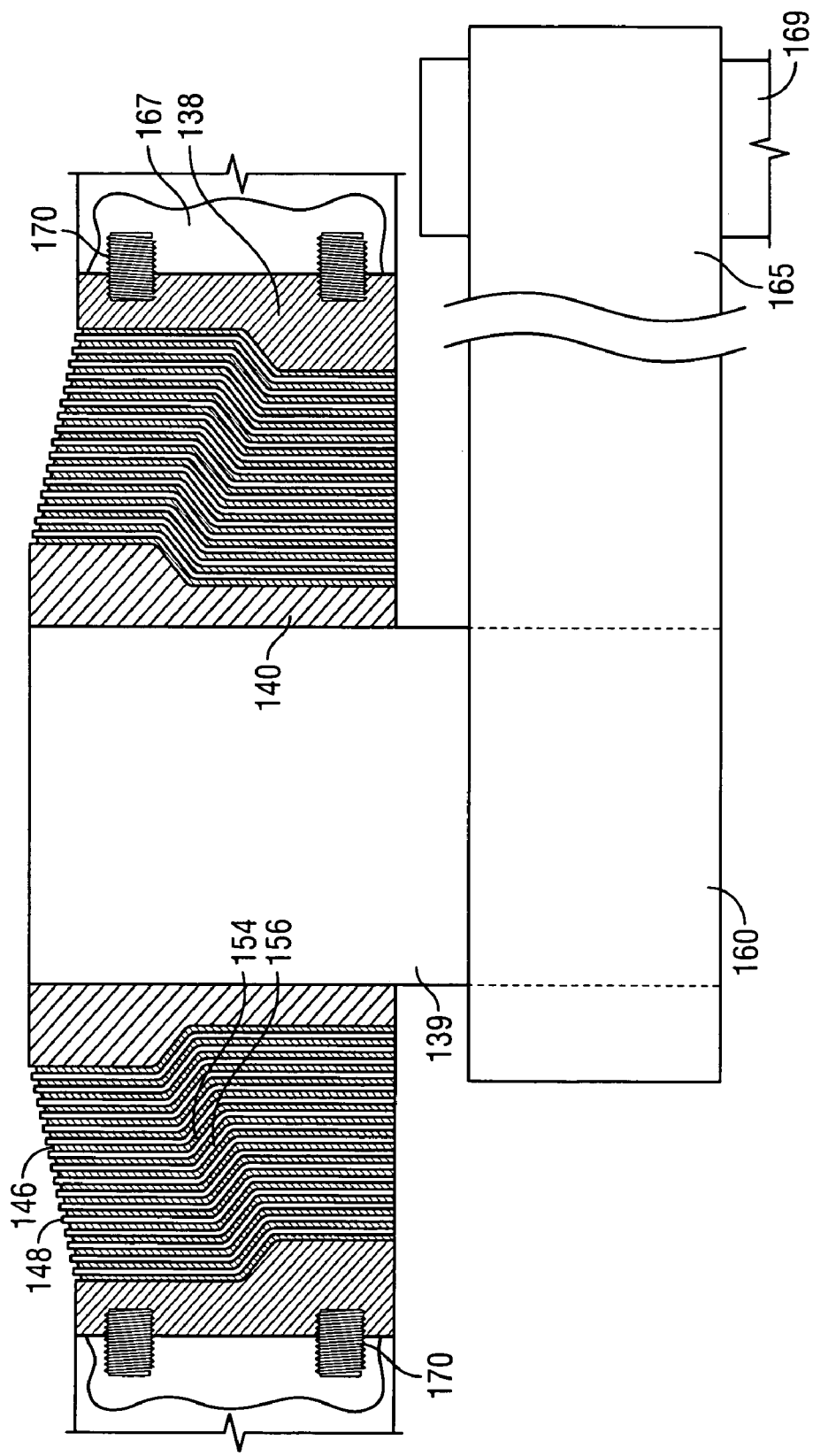
FIG. 6 is a further enlarged view of a different form of the invention, showing a somewhat different form of elastomeric bearing, used in a different application.

Referring now to FIG. 6, there is shown a somewhat modified version of the Z-bearing of the invention used in another illustrative application. Here there is shown an outer race 138, an inner race 140 and a plurality of alternate elastomeric and metal layers 146, 148. These layers are tightly bonded to one another. In this instance, the inner race 140 is affixed to a shaft 139 which supports a trailing arm 160, i.e., the movable portion of a vehicle suspension. The outer race 138 is fixed to the frame 167 of the vehicle by fasteners 170. In this instance, the outer end 165 of the trailing arm 160 and the axle 169 move up and down as the vehicle transverses rough terrain, but there is extreme resistance to end wise movement in either direction. One difference in this embodiment and the first embodiment is that the steps, angles, or offsets 154, 156 are more sharply angled than in their counterpart bearing 36. The design of the second embodiment was equally successful, however, it was found that the less pronounced or lower degree of offset in the version of FIG. 5 still met the performance goals for the novel form of bearing. Hence, the version of FIG. 5 was preferred.

The bearings used in an example of one form of the present invention were manufactured by taking the metal portions from continuous cold formed sheets of stainless steel formed into cone shapes, then forming a modified cone with a partial shape of the smaller cylinder, and finally forming the outer cylinder from the other end of the cone, leaving the offset portion in the middle. These shapes may be annealed to aid in forming, and thereafter the shapes may be heat treated to obtain increased toughness as a desired result. This forming is preferably done in a progressive die, forming the shapes as pointed out. The layers are then nested, and the elastomer is injected into the mold, or the elastomer is inserted through a transfer molding process. The various rubbers include natural rubber, polybutadiene, EPDM, nitrile, Neoprene, butyl, silicone, or mixtures thereof. For some applications, a mixture of natural rubber and polybutadiene was preferred. A wide variety of metals other than stainless steel may also be used for the rigid laminae.

A specimen was tested wherein an elastomeric bearing had an overall diameter of about 8 inches, an axial dimension of about 2.75 inches and a bore on the inside diameter of 2.9 inches. Such a bearing had a torsional stiffness of one unit (in in. lbs. per degree), while it had a radial stiffness of 2,000 units, an axial stiffness of 100 units, and a cocking stiffness of 1,000 units. These figures are only exemplary, but they demonstrate that the axial stiffness of over 50 to 200 times the torsional stiffness can be obtained with this construction, while not having the disadvantages requiring of two or more different bearings to perform in this application.

It will thus be seen that the present invention provides a new and useful elastomeric bearing having a number of advantages and characteristics including those pointed out and others which are inherent in the invention. It is anticipated that those skilled in the art will discover numerous variations and modifications to the disclosed embodiments, and it is anticipated that such may be made without departing from the spirit of the invention or the scope of the appended claims.

The invention claimed is:

1. An elastomeric bearing comprising, in combination, an outer cylindrical race, an inner race coaxial with said outer race, and a movement axis parallel to said inner and outer races, said elastomeric bearing further including a core portion disposed between said outer and inner races, said core portion having a plurality of resilient laminae and a plurality of non-resilient laminae, said resilient and non-resilient laminae being interleaved with one another, each of said lamina having an axially inner cylindrical portion of a given diameter, an axially outer cylindrical portion of a greater diameter than said given diameter and, lying between said axially inner and said axially outer laminae, an angled portion joining said given diameter laminae to said greater diameter laminae, each of said laminae having a continuous cross section around the entire said given diameter and said greater diameter and of one piece, whereby said elastomeric bearing has comparatively small resistance to torsional movement and great resistance to both radial and axial movement.

2. An elastomeric bearing as defined in claim 1 wherein said resilient laminae comprise an elastomeric material.

3. An elastomeric bearing as defined in claim 1 wherein said resilient laminae comprise a natural rubber.

4. An elastomeric bearing as defined in claim 1 wherein said resilient laminae comprise a blend of polybutadiene and natural rubber.

5. An elastomeric bearing as defined in claim 1 wherein said resilient laminae include at least one elastomer from the class of elastomers consisting of natural rubber, polybutadiene, EPDM, nitrile, Neoprene, butyl, silicone and mixtures thereof.

6. An elastomeric bearing as defined in claim 1 wherein said non-resilient laminae comprise a metal material.

7. An elastomeric bearing as defined in claim 1 wherein said non-resilient laminae comprise a steel material.

8. An elastomeric bearing as defined in claim 1 wherein said non-resilient laminae comprise a stainless steel material.

9. An elastomeric bearing as defined in claim 1 wherein said angled portion comprises an angle of between about 10° and about 50°.

10. An elastomeric bearing as defined in claim 1 wherein said angled portion comprises an angle of about 35° to about 50°.

11. An elastomeric bearing as defined in claim 1 wherein said angled portion comprises an angle of about 10° to about 20°.

12. An elastomeric bearing as defined in claim 1 wherein said core portion includes at least eleven resilient and ten non-resilient laminae.

13. In a rotary wing aircraft having a plurality of blades, each blade being mounted on one leg of a rotatable yoke, each of said yoke legs having a pair of spaced apart, opposed cylindrical bearing retainers forming a portion of an outside leg of said yoke, each of said blades being secured for at least flap movement about a flap axis defined by said bearing retainers, said aircraft including at least one elastomeric bearing, including an outer race and an inner race, said outer race of said bearing being affixed to one of said bearing retainers, and said inner race being secured to a shaft defining said flap axis, said elastomeric bearing further including a core portion between said inner and outer races, said core portion comprising a plurality of resilient laminae and a plurality of non-resilient laminae, said resilient and non-resilient laminae being interleaved with one another, each of said laminae having an axially inner cylindrical portion of a given diameter, an axially outer cylindrical portion of a greater diameter than said given diameter and, lying between said inner and outer laminae, angled portions joining said given diameter laminae to said greater diameter laminae, each of said laminae being continuous cross section around the entire said given diameter and said greater diameter and of one piece, whereby said elastomeric bearings have comparatively small resistance to flap movement of said blade and great resistance to both radial and axial movement of said blade.

14. A combination as defined in claim 13 wherein said at least one elastomeric bearing comprises two elastomeric bearings, each one received within said bearing retainer.

15. A vehicle suspension system including a vehicle frame, at least one outer race of an elastomeric bearing fixedly secured to said frame, an inner race of said bearing affixed to a swing arm mounting an axle, and a core portion of said elastomeric bearing comprising a plurality of resilient laminae and a plurality of non-resilient laminae, said laminae being interleaved with one another, each of said laminae having an axially inner cylindrical portion of a given diameter, an axially outer cylindrical portion of a greater diameter than said given diameter and, lying between said inner and outer laminae, an angled portion joining said given diameter laminae to said greater diameter laminae, each of said laminae being continuous cross section around the entire said given diameter and said greater diameter and of one piece, whereby said elastomeric bearing has comparatively small resistance to rotary movement of said swing arm and great resistance to both radial and axial movement of said swing arm.

16. A vehicle suspension system as defined in claim 15 which includes at least two swing arms and two elastomeric bearings.

* * * * *